UNITED STATES PATENT OFFICE.

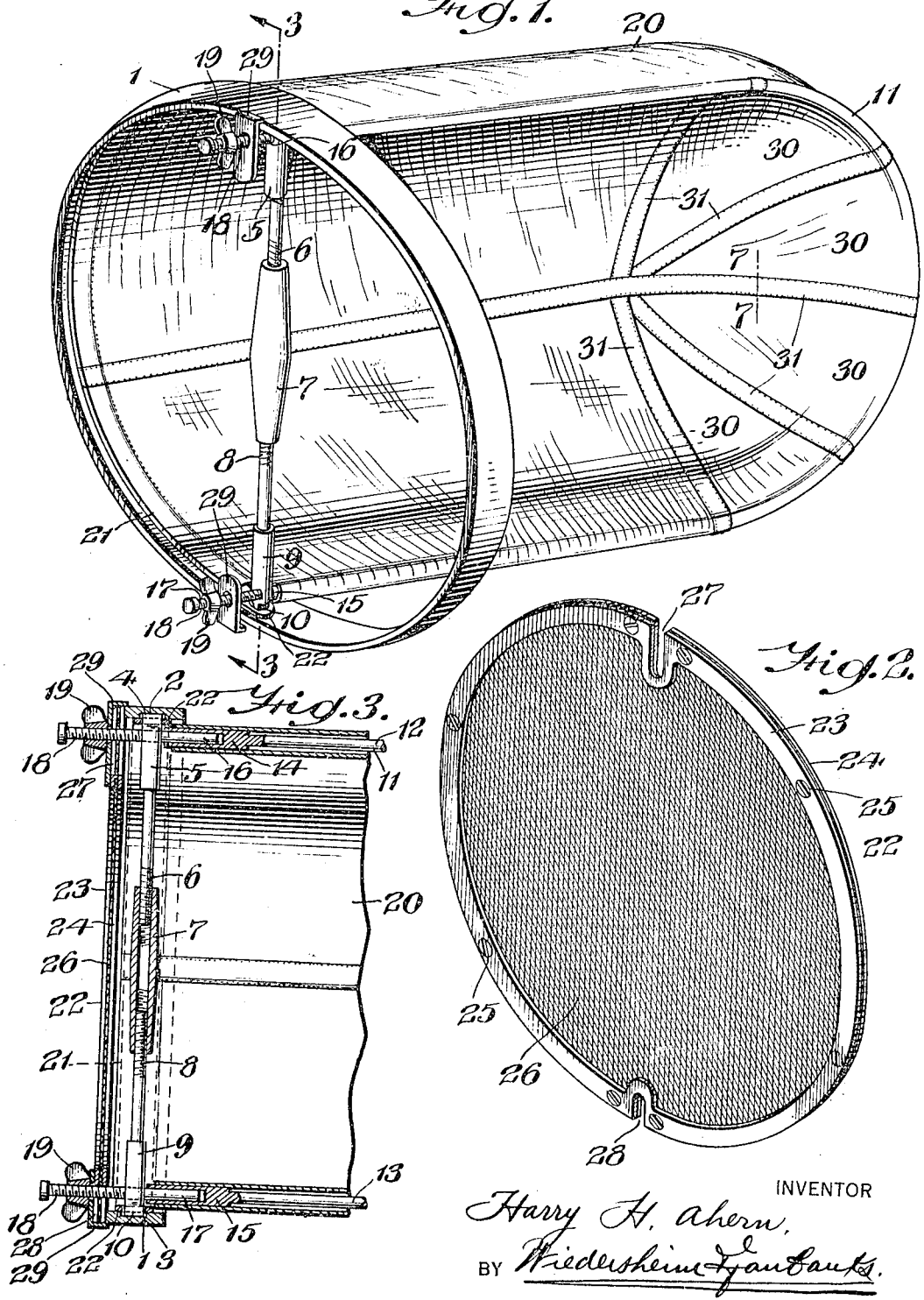

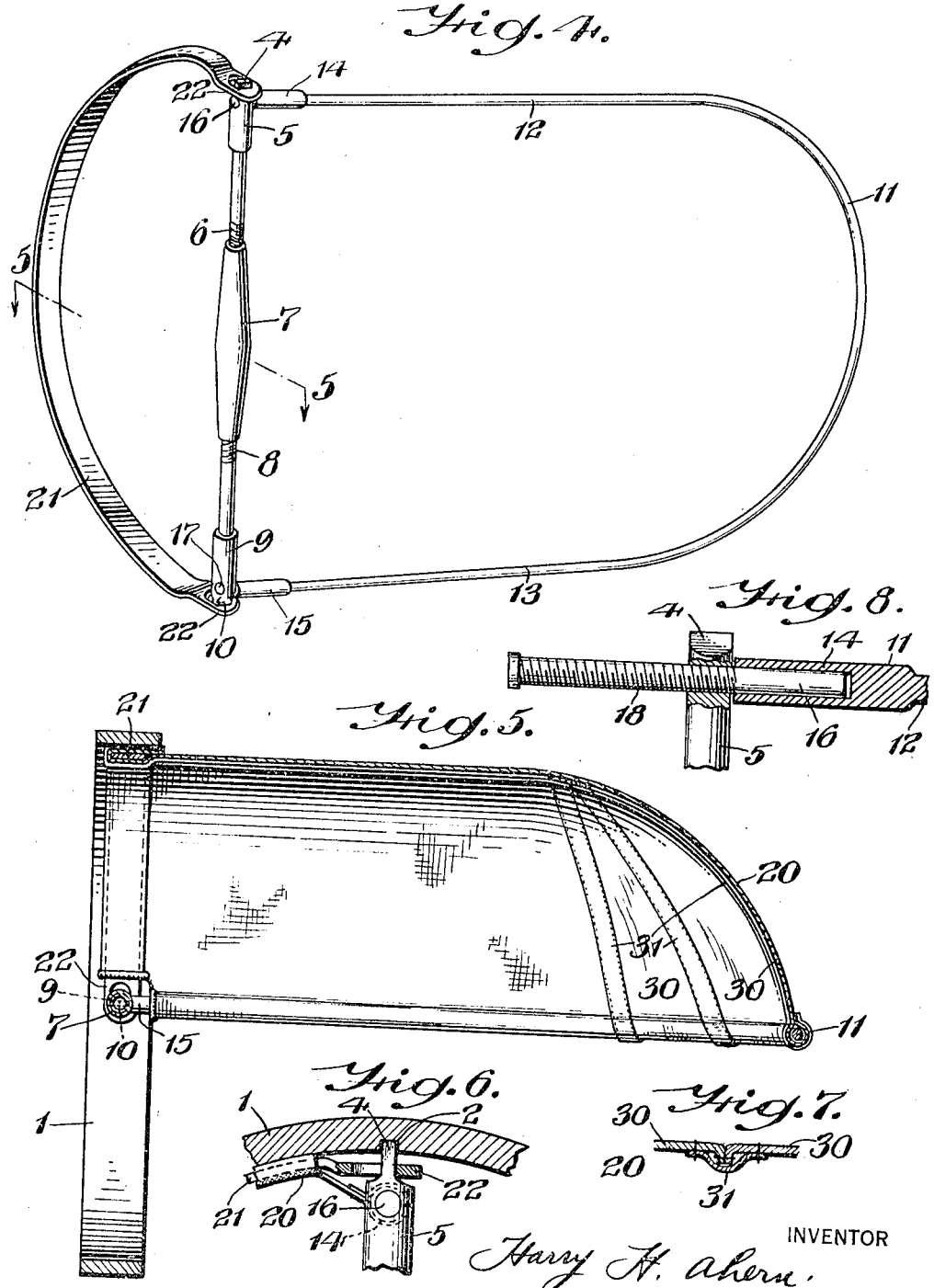

HARRY H. AHERN, OF NEWPORT NEWS, VIRGINIA.

WIND-SCOOP AND SCREEN FOR PORT-HOLES.

1,256,281.      Specification of Letters Patent.      Patented Feb. 12, 1918.

Application filed November 15, 1916. Serial No. 131,397.

*To all whom it may concern:*

Be it known that I, HARRY H. AHERN, a citizen of the United States, residing at Newport News, county of Warwick, State of Virginia, have invented a new and useful Wind-Scoop and Screen for Port-Holes, of which the following is a specification.

In order to ventilate state rooms or the interior of vessels, ships and the like, it has heretofore been the practice to provide the port holes thereof with a removable wind scoop usually constructed out of thin sheet metal which has a portion frictionally engaging the port hole frame.

This device of the prior art possesses various objectionable features since in the first place when the wind scoops are removed, (as is the practice during the winter or colder months of the year,) a great deal of space is taken up in storing of the same, and in addition the wind scoops being made of thin, sheet metal are liable to become bent, distorted or damaged not only while being stored but in handling during their insertion in and withdrawal from the port hole frame.

A further disadvantage of the devices of the prior art is that the same are ordinarily only frictionally secured in the port hole frame, and hence they are liable to be accidentally knocked or blown out and lost and in addition the vibration or rocking of the ship frequently loosens the wind scoop causing the same to be lost from the port hole frame.

In addition, the metal wind scoops of the prior art, owing to the corrosive action of the salt air and salt water, sooner or later become rusted and present a disagreeable appearance to the user.

To obviate the above disadvantages, I have devised a novel construction of wind scoop, which can be readily locked and unlocked with respect to the port hole frame and consists of an expansible device or turn buckle, located and secured diametrically with respect to said port hole frame, said turn buckle having its upper and lower extremities pointed or of reduced diameter and adapted to interlock with diametrically opposite seats or notches in the port hole frame, said turn buckle at its opposite ends receiving the terminals or threaded stems of a U-shaped frame, which is adapted to support the wind scoop which I preferably make of canvas, cloth or other textile material which takes up no room when stored and which can be removed and washed when desired.

At its inner extremity the wind scoop carries a semi-circular ring, which has slots in the ends thereof through which pass the pointed ends of the turn buckle, the walls of said slots being so constructed as to coöperate with the pointed ends of said turn buckle, so that said semi-circular ring is always held in its proper position, that is, at substantially a right angle to the U-shaped frame, which carries the wind scoop of textile material.

My invention further consists in novel means for securing the turn buckle, the wind scoop and their adjuncts in fixed or locked position with respect to the annular port hole frame.

It further consists of a novel construction of a screen or screening device, which can be readily applied to or disconnected from my novel mechanism which supports the wind scoop in position, said screen being capable of being used independently of the wind scoop and the wind scoop being capable of use independently of the screen, or, if desired, both the screen and the wind scoop can be used simultaneously as is frequently desirable.

To the above ends, my invention consists of a novel construction of a wind scoop and screen, which can be readily locked in position or removed from the port hole frame with equal facility and wherein the wind scoop is preferably made of flexible or textile material, which greatly facilitates storage of the same and which can be readily disengaged from its supporting frame when desired for the purpose of cleaning or washing, inspection or repairs.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of my novel construction of wind scoop, showing also a port hole frame to which the same is applicable.

Fig. 2 represents a perspective view of a screen in detached position which may be employed in conjunction with my wind scoop.

Fig. 3 represents a section on line 3—3 Fig. 1.

Fig. 4 represents a perspective view of the turn buckle and the wind scoop supporting members carried thereby, the textile wind scoop member being removed.

Fig. 5 represents a section on line 5—5 Fig. 4 showing the wind scoop in position in the port hole frame.

Fig. 6 represents, on an enlarged scale, a section of the top of the port hole frame, showing the turn buckle in engagement therewith.

Fig. 7 represents a section on line 7—7 Fig. 1.

Fig. 8 represents an enlarged fragmentary view showing the manner of mounting the deflector frame with respect to the turn buckle.

Similar numerals of reference indicate corresponding parts in the figures.

Referring to the drawings—

1 designates a port hole frame, which it will be understood is of the usual construction and is immovably or fixedly supported in the shell plating of the vessel around the port hole, said frame consisting of an annular ring, as will be understood from Figs. 1 and 3. In adapting a port hole frame of the ordinary type of construction to my invention, I form therein at diametrically opposite upper and lower points, seats or recesses 2 and 3, the upper recess 2 receiving the upper pointed or reduced end 4 of the rod 5, which is provided with the right-hand threaded portion 6, which engages a similarly threaded portion of the central handle member 7, the lower portion of the latter being provided with left-hand threads, which are engaged by the left-hand threaded portion 8 of the lower rod 9, which is provided with the pointed or reduced end 10, which engages the lower seat or recess 3 in the port hole frame, as will be understood from Fig. 3.

The parts 5, 7 and 9 when in assembled position, as seen in Figs. 1, 3 and 4, form a turn buckle and it will be seen that upon the rotation of the central or handle member 7, the distance between the pointed terminals 4 and 10 can be varied, so that the turn buckle composed of the three parts aforesaid can be readily inserted into or removed from and interlocked with port hole frames of varying diameters.

In the construction seen in Figs. 1, 3 and 4, I employ a U-shaped frame member 11 which has the upper and lower rods 12 and 13, which terminate in the hollow sleeves 14 and 15, whose outer ends receive the rods 16 and 17, respectively, said latter rods extending transversely through the members 5 and 9 of the turn buckle, as will be understood from Fig. 8, and having their outer ends 18 screw-threaded and provided with wing nuts 19 or other suitable fastening devices, this being the construction seen in Figs. 1, 3 and 8, the construction seen in Fig. 4 being slightly modified as will be hereinafter explained.

The upper and lower rods 12 and 13 of the U-shaped frame serve as a support for the wind scoop 20, the general contour of the latter being understood from Figs. 1 and 5, the material of which said wind scoop is composed being preferably canvas, cloth or some other similar suitable flexible, textile fabric or collapsible material, which can be readily removed when it is desired to wash the same, as will be hereinafter explained.

In order to cause the wind scoop 20 to always assume a concaved or trough shaped contour so as to catch the wind or breeze and deflect it through the port hole frame, I employ the semi-circular ring 21 seen at the left of Figs. 1 and 4, whose upper and lower terminals 22 are slightly flattened and provided with slots through which pass the reduced ends 4 and 10 of the turn buckle member, as will be understood from Figs. 4 and 6, said slots being constructed, so that said semi-circular ring 21 will always stand angularly to the turn buckle member about as seen in Figs. 4, 5 and 6, and will be concentric with the contiguous portion of the port hole frame 1 when the parts are assembled, as will be understood from Figs. 1 and 5, it being understood that said semi-circular ring 21 passes through a casing at the inner end of the wind scoop formed by stitching or otherwise, as will be understood from the upper left hand portion of Figs. 5 and 6.

In the construction seen in Fig. 4, I have omitted the threaded stems 18 and the wing nuts 19, shown in Figs. 1, 3 and 8, as they can be dispensed with when it is desired to use my device solely as a wind scoop and without the screen, to be referred to.

Fig. 4 shows the semi-circular ring 21, the U-shaped frame 11 and the turn buckle composed of the parts 5, 7 and 9 as they appear, when the textile wind scoop 20 is removed therefrom, it being understood that when it is desired to store the wind scoops, the semi-circular ring 21 can be disengaged from the ends of the turn buckle and if desired withdrawn from the textile wind scoop. The wind scoop can remain in engagement with the U-shaped frame 11 and it will be seen that when the parts are placed flat upon the floor, shelves or other support, the scoop members will take up no more room than the frame member 11.

Under certain conditions in which my device may be desired to be used, as in tropical countries, it is frequently desirable to employ an insect barrier or screen for the port hole frame in conjunction with my novel construction of wind scoop for the purpose of excluding flies, mosquitoes and other insects and I have shown in Fig. 2 one form of screen 22 which can be effectively employed in conjunction with my wind scoop, said screen consisting of a plurality of rings or annular frames 23 and 24, which are held together by screws or other fastening devices, as 25, one of said frames, as 23, being simply drilled through and the other of said frames, as 24, being tapped to engage the threads of the screws or fastening devices 25, whereby in case the screen proper 26, which is held between said frames, becomes punctured, torn or damaged, it can be readily renewed, according to requirements by merely unscrewing the screws 25.

In order to enable the screen member 22 to be readily inserted in position, I provide the same with the diametrically located slots 27 and 28, the slot 27 being slightly longer than the slot 28 so as to facilitate the insertion and withdrawal of the screen from position, the position of the screen when assembled with respect to the port hole frame being readily understood from Fig. 3, wherein it will be seen that the upper slot 27 is in engagement with the upper threaded stem 18, while the lower slot 28 is in engagement with the lower threaded stem 18, the angular-shaped clips 29 serving to close said slots when the wing nuts 19 are tightened therein so as to positively prevent the ingress of mosquitoes or other insects under any conditions.

It will be understood that when the screen 22 is employed, it is necessary to use the construction seen in Figs. 1, 3 and 8, wherein the threaded stems 18 are present. When it is desired to utilize only the wind scoop feature of my invention, I need employ only the construction seen in Figs. 4, 5 and 6, wherein the rods as 16 and 17 terminate or are secured in the upper and lower turn buckle members, 5 and 9, as seen in Fig. 4.

It will be understood that the textile wind scoop is detachably secured to the frame 11 and the ring 21 in any suitable manner, as will be understood from Fig. 5, and the outer or right hand end of the wind scoop seen in Fig. 1 can be formed of a plurality of gores 30, which can be assembled or stitched, as seen in Fig. 7, and reinforced by tapes 31, so as to produce the concaved or trough shape desired. The position of the wind scoop can be readily reversed from the position seen in Fig. 1 by inverting the turn buckle, so as to catch or deflect the breeze according to requirements.

The operation is as follows:—

When it is desired to place the wind scoop in position, it is only necessary to assemble the textile wind scoop member 20 upon the semi-circular ring 21 and the U-shaped frame 11. The turn buckle being in position, the upper and lower reduced ends thereof are inserted in the seats 2 and 3 of the port hole frame and the handle 7 of the turn buckle is next rotated to the desired extent so as to separate the end members 5 and 9 of the turn buckle, so that their pointed terminals firmly engage and interlock with the diametrically opposite seats in the port hole frame 1. The semi-circular ring 21 will be held neatly and exactly in a position concentric with one half of the port hole frame, as will be understood from Fig. 1, so that the parts when assembled appear substantially as seen in said Fig. 1 and the air caught by the wind scoop 20 will be deflected through the port hole frame into the state room or other desired point, as will be evident.

By reversing the position of the parts from the position seen in Fig. 1, the wind scoop will face in the opposite direction, so that it will be apparent that the same can be used in either extreme position.

When it is desired to use the screen 22 seen in Fig. 2 in connection with the wind scoop, it is only necessary to assemble the parts in the manner seen in Fig. 3 and to tighten the wing nuts 19 so that the clips or closures 29 will close the slots 27 and 28, whereupon it will be seen that the screen is firmly and effectively secured in position with respect to the wind scoop, and port hole frame, and the ingress of flies or other insects prevented.

It will be understood from the foregoing that the upper and lower slots 2 and 3 in the port hole frame 1 can be readily formed with any suitable implement and as seen in Figs. 1 and 6, extend transversely to said port hole frame, so that the concave portion of the wind scoop is rigidly held so as to face toward the bow in such a manner that by the forward motion of the vessel, a quantity of air is caught by the scoop and thrown into the state-room or hold through the port hole frame or, if the wind is from the rear, by rotating the handle 7 of the turnbuckle in the proper direction the turnbuckle and scoop can be reversed or inverted and the concave face of the scoop caused to face in the desired direction.

It will be understood from Figs. 1, 4 and 6 that the slotted ends of the ring 21 are caused to interlock with the terminals 4 and 10 of the turnbuckle in such a way that said ring will stand at a right angle to the frame 11 and accurately engage the contiguous portion of the frame 1.

It will be further understood when it is desired to store the scoops, it is not necessary to remove the ring 21 from the textile scoop, as the ends of said ring can be readily disengaged from the ends of the turnbuckle and said ring and the portion of the textile scoop engaging it merely collapsed or knocked down or folded upon the members 12 and 13 of the frame 11. I am the first in the art to employ a collapsible or knock down wind scoop of the character hereinabove described and my claims to these features are to be interpreted with the scope accorded to inventions of this character.

It will now be apparent that I have devised a novel and useful construction of a wind scoop and screen for port holes which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

The term insect barrier as herein employed is intended to apply to a screen of reticulated material or any other screen that will permit the passage of air while excluding mosquitos and other insects.

Having thus described my invention, what I claim as new and desire to secure by Letters Patent, is:—

1. In a device of the character stated, a flexible wind scoop, means for supporting the outer portion of the same, a semi-circular ring engaging the inner portion of the wind scoop for causing said inner portion to assume a concave contour, and a diametrically extending adjustable support engaging the ends of said semi-circular ring, and adapted to secure said wind scoop in a port hole frame.

2. In a device of the character stated, a U-shaped frame, a turnbuckle having its outer ends pointed and supporting the terminals of said U-shaped frame, a semi-circular ring having its ends slotted and engaged by the pointed ends of said turnbuckle, and a flexible wind scoop common to said U-shaped frame and semi-circular ring.

3. The combination of a U-shaped frame, a semi-circular ring located at a right angle to said frame, a collapsible wind scoop common to said frame and ring, and an adjustable support also common to said frame and ring.

4. In a device of the character stated, a turnbuckle having its ends pointed and adapted to engage seats in a port hole frame, a wind scoop frame carried by said turnbuckle, a semi-circular ring also carried by said turnbuckle, and a collapsible wind scoop common to said scoop frame and ring.

5. In a device of the character stated, a turnbuckle having its ends pointed and adapted to engage seats in a port hole frame, a wind scoop frame carried by said turnbuckle, a semi-circular ring also carried by said turnbuckle, and a wind scoop common to said scoop frame and ring.

6. The combination of a collapsible wind scoop, an adjustable support extending diametrically across the inner end of said wind scoop, means for varying the distance between the ends of said support, and a semi-circular ring having its ends adapted to engage and interlock with the ends of said support, said ring being secured to the inner portion of said wind scoop.

7. A wind scoop comprising a turnbuckle provided with ends of angular form in cross-section, adapted to enter correspondingly-shaped recesses in the wall of a port hole, an U-shaped frame member connected with and extending outwardly from the turnbuckle, a loop-shaped frame member connected with the turnbuckle and disposed at an angle to the U-shaped member, and flexible imperforate material connected with said frame members.

8. The combination of a support constructed and arranged to be fixed in a port hole, a wind-scoop having its inner end in said support, connecting rods joining the support and the scoop and having threaded portions extending inwardly beyond the support, nuts mounted on said threaded portions of the rods, an insect barrier frame having notches receiving the inwardly-extending portions of the rods and having its notched portions opposed to the nuts, and closure-clips for the notches mounted on the rods and arranged between the nuts and the notched portions of the frame.

9. A wind scoop having at its inner end a turnbuckle disposed at an angle to the length of the scoop and provided with ends, of angular form in cross-section, adapted to enter correspondingly-shaped recesses in the wall of a port hole, and hold the scoop against swinging.

10. A wind scoop comprising a support constructed and arranged to be fixed in a port hole, an U-shaped frame member connected with and extending outwardly from the support, a loop-shaped frame member arranged within and detachably connected with the support and disposed at an angle to the U-shaped member, and flexible imperforate material connected with said frame members.

HARRY H. AHERN.

Witnesses:
E. HAYWARD FAIRBANKS,
C. D. McVAY.

Copies of this patent may be obtained for five cents each, by addressing the "Commissioner of Patents, Washington, D. C."